United States Patent [19]

Wallace

[11] 4,277,108
[45] * Jul. 7, 1981

[54] HARD SURFACING FOR OIL WELL TOOLS
[75] Inventor: Duane W. Wallace, Houston, Tex.
[73] Assignee: Reed Tool Company, Houston, Tex.
[*] Notice: The portion of the term of this patent subsequent to Aug. 23, 1994, has been disclaimed.
[21] Appl. No.: 145,413
[22] Filed: May 1, 1980

Related U.S. Application Data
[62] Division of Ser. No. 7,090, Jan. 29, 1979.
[51] Int. Cl.³ .................................... F16C 29/02
[52] U.S. Cl. .................................... 308/4 A; 308/241
[58] Field of Search ............. 308/4 A, 241, 239, 4 R, 308/237 R; 427/37; 428/539.5; 175/371; 166/241

[56] References Cited
U.S. PATENT DOCUMENTS

| | | | |
|---|---|---|---|
| 2,709,213 | 5/1955 | Gibson | 427/37 |
| 3,800,891 | 4/1974 | White et al. | 428/539.5 |
| 4,043,611 | 8/1977 | Wallace | 308/4 A |

Primary Examiner—Lenard A. Footland
Attorney, Agent, or Firm—Michael J. Caddell

[57] ABSTRACT

A method is disclosed for applying to rotating well drilling parts such as tool joints a multiple layer of hardbanding materials to provide extended wear service for the well tools without incurring any of the accompanying spalling normally associated with heavy layers of hardbanding.

3 Claims, 3 Drawing Figures

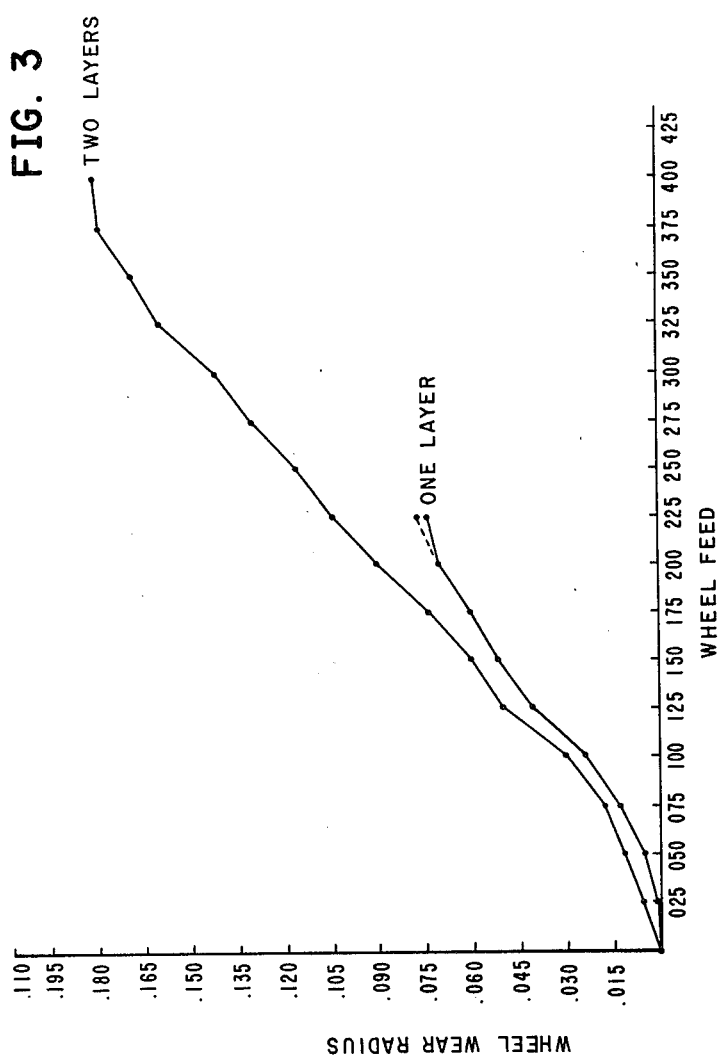

HARD SURFACING FOR OIL WELL TOOLS

This is a division of an original application, Ser. No. 007,090, filed Jan. 29, 1979, by Duane W. Wallace for "HARD SURFACING FOR OIL WELL TOOLS".

BACKGROUND OF THE INVENTION

During the drilling operations when a borehole is drilled through underground formations the drill string undergoes considerable abrasion during rotation within the borehold and/or the well casing. The abrasion is amplified when the drilling mud contains abrasive formation particles being flushed out of the drilling area by the drilling mud. The wear resulting from this abrasion often occurs on the shouldered areas of the tool joints and contributes greatly to a very rapid failure of the highly stressed thread areas of said tool joints.

Methods of slowing or reducing this wear involved fusing a layer of cast tungsten carbide particles in an alloy steel matrix. This resulted in an extended useful life of the tool joint but in many instances gave rise to a second detrimental effect which was a higher than normal rate of wear on the inside of the well casing. Later, it was found that a layer of mild steel alloy on top of a layer of large sintered tungsten carbide particles would greatly reduce the wear in the casing while extending the life of the tool joint. When offshore drilling became very prevalent in the industry, the single hardbanding procedure and the hardbanding procedure with a mild steel overlay resulted in an extended life for the tool joint which, though better than a plain steel joint, still left a lot to be desired.

Due to the expense and time involved in pulling drilling strings from offshore wells and shuttling new or resurfaced drill string components to the site from somewhere onshore, the wear and tear on drill strings became an even greater consideration. Attempted solutions involved placing thicker bands of hardsurfacing material on the tool joints. Unfortunately, this failed to solve the problem since the cast tungsten carbide particles are extremely brittle and therefore subject to spalling. Spalling is the failure of a hard brittle material during high point loading in compression.

The present invention provides a much thicker hardbanding application with accompanying extended life of the tool joint without increased susceptibility to failure due to spalling. This is achieved by utilizing multiple layers of sintered tungsten carbide particles in a steel matrix which provides a thicker overall surface of hardbanding material while the tougher sintered tungsten carbide particles are resistent to spalling.

BRIEF DESCRIPTION OF THE DRAWINGS

FIG. 3 is a graph illustrating the improved wear characteristics of the invention.

DESCRIPTION OF THE PREFERRED EMBODIMENTS

Figure 1:
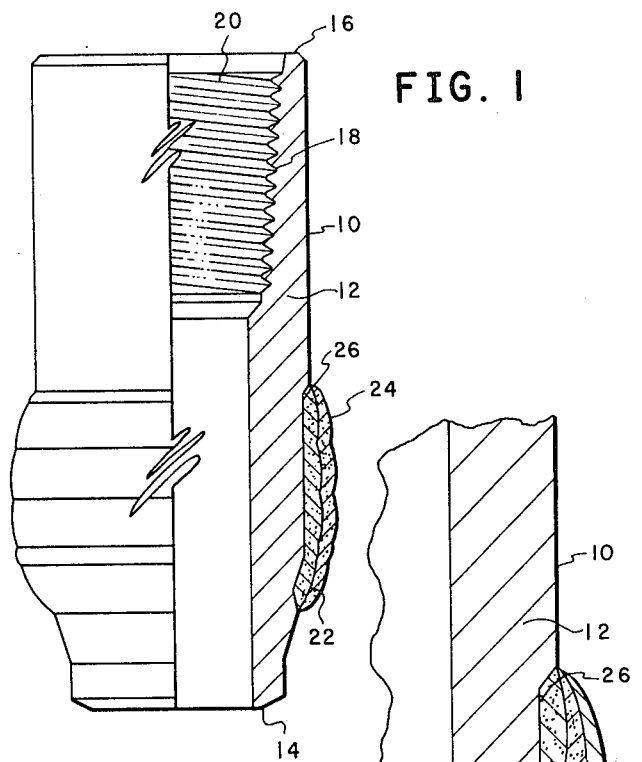
FIG. 1 is a partial cross-sectional view of a tool joint made according to the present invention.
Figure 2:
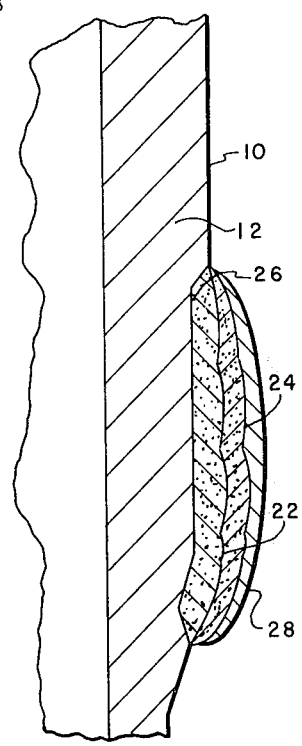
FIG. 2 is a second embodiment of the invention.

Referring to the FIG. 1, a typical tool joint section 10 comprising a body 12 having a box end 16 with internal threads 18 is manufactured according to normal tool joint technology. A hardbanding groove is formed at 26 along the wear susceptible shoulder of the tool joint extending over a considerable portion of the tool joint length. The groove 26 may be formed during the making of the tool joint or can be machined into the finished tool joint at any time prior to the application of the hard metal layers. The hard metal layers are usually applied in five individual side-by-side passes of a welding machine.

The tool joint is rigged up in a rotating fixture in close proximity to the MIG welding machine. The welding process is started with the gas-blanketed electrode consisting of a mild steel wire, forming a puddle at one end of the hard surface groove 26. The tool joint is rotated beneath the welding electrode and the large tungsten carbide particles are poured into the weld puddle formed by the electrode. Due to the high temperatures in the proximity to the electrode it is preferable that the large particles be placed near the back end of the weld puddle near its cooling edge.

The hard metal particles comprise large sintered tungsten carbide particles with cobalt or other suitable metallic binder. Preferably the ratio of tungsten carbide to steel in the deposit is in the range of 60% tungsten carbide and 40% steel. The size of the particle is a 14–20 mesh size. This size particle will pass through a 14 mesh screen but will be retained on a 20 mesh screen. The range of acceptable parameters is 40 to 65% tungsten carbide with 60 to 35% steel. The size of the cobalt-tungsten carbide particles preferable ranges from about 10 mesh to about 24 mesh.

Each pass of the electrode around the tool joint is approximately 3/32 inch thick and about ¾ of an inch wide. Thus, a total initial hardbanding layer next to the tool joint will be five passes of the welding rod side by side with a resulting hardband approximately 3.75 inches wide and 3/32 to ⅛ inch thick. After the welding has been performed to provide the initial layer, the welder is indexed back to the starting point and repeats the same process for the second layer.

The second layer of hardbanding material also comprises large sintered tungsten carbide particles in a mild steel matrix applied in thicknesses of approximately 3/32 to ⅛ inch thick. The same metallurgical composition of the hard metal particles and the binders are utilized in the second pass; however, the percentage of tungsten carbide particles in the second layer will be higher than in the first layer. The weld penetration is into the first layer (containing 40% steel), whereas the first layer penetration is into the tool joint surface, which is 100% steel. Therefore, the second layer will provide more wear protection than the usual single layer hard surfacing application.

Applying two layers of hardbanding material results in a total thickness of the hardsurfacing material in the range of 7/32 to 9/32 inch. In the prior art the maximum practical hardsurfacing thickness usually did not exceed 3/16 of an inch without suffering considerable spalling failure.

In addition to the double layer hardsurfacing described above, an alternate embodiment would be the application of a third layer of mild steel on top of the second layer of sintered tungsten carbide in a steel matrix. The application of the third layer of mild steel results in an alloying of the steel with the tungsten and carbon to arrive at a relatively hard third layer which is extra-resistant to spalling and failure and which will provide abrasive wear protection to the inside of the casing.

Although a specific preferred embodiment of the present invention has been described in the detailed description above, the description is not intended to limit the invention to the particular forms or embodiments disclosed therein since they are to be recognized as illustrative rather than restrictive and it would be obvious to those skilled in the art that the inventon is not so limited. Thus, the invention is declared to cover all changes and modifications of the specific example of the invention herein disclosed for the purposes of illustration which do not constitute departure from the spirit and scope of the invention.

The embodiments of the invention in which an exclusive property or privilege is claimed are defined as follows:

1. A well tool having surface wear properties enhanced by hard metal banding, said tool comprising a generally cylindrical steel tool body, a first layer of hardbanding material fused to said body, said first layer comprising large particles of sintered tungsten carbide in a mild steel matrix, and a second layer of hardbanding material on top of said first layer, said second layer comprising sintered tungsten carbide particles in a mild steel matrix.

2. The well tool of claim 1 further comprising a third layer of mild steel alloy on top of said second layer, said third layer applied by heat process whereby tungsten from said second layer alloys with the mild steel of said third layer to form a third layer of tungsten, carbon, and steel.

3. The well tool of claim 1 or 2 wherein said sintered tungsten carbide particles originally comprised tungsten carbide sintered in a metal binder having a size in the range of 10 mesh to 24 mesh wherein said layers comprised from 40 to 65% tungsten carbide and from 60 to 35% steel alloy.

* * * * *